US006506457B2

(12) United States Patent
Hum

(10) Patent No.: US 6,506,457 B2
(45) Date of Patent: Jan. 14, 2003

(54) LUBRICIOUS, WEAR RESISTANT SURFACE COATING BY PLASMA POLYMERIZATION

(75) Inventor: Larry L. Hum, Cottage Grove, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 0 days.

(21) Appl. No.: 09/822,946

(22) Filed: Mar. 30, 2001

(65) Prior Publication Data

US 2002/0142105 A1 Oct. 3, 2002

(51) Int. Cl.[7] .................................................... C08J 7/18

(52) U.S. Cl. ............... 427/490; 427/255.3; 427/255.39; 427/255.394; 427/294; 427/322; 427/534; 427/536; 427/569; 427/591

(58) Field of Search ................................. 427/490, 491, 427/569, 255.39, 255.394, 255.3, 294, 534, 536, 322

(56) References Cited

U.S. PATENT DOCUMENTS 4,632,842 A * 12/1986 Karwoski et al. .............. 427/2
5,133,422 A 7/1992 Coury et al. ................ 128/784
5,662,819 A 9/1997 Kadomura .................. 438/711
5,888,593 A 3/1999 Petrmichl et al. ........... 427/563
5,972,435 A 10/1999 Takai et al. ................. 427/488

OTHER PUBLICATIONS

Chan, C., et al., "Polymer surface modification by plasmas and photons", *Surface Science Reports*, 24, pp. 1–54, (1996) (No Month Avail.).

Ratway, R.J., et al., "Surface Modification of Chlorobutyl Rubber by Plasma Polymerization", *Journal of Polymer Science*, 35 (11), pp. 1651–1660, (Aug. 1997).

* cited by examiner

*Primary Examiner*—Bernard Pianalto
(74) *Attorney, Agent, or Firm*—Schwegman, Lundberg, Woessner & Kluth, P.A.

(57) ABSTRACT

The present methods provide an amorphous, conformal, protective, abrasion-resistant, lubricious fluoropolymer coating on to a polymer substrate via a gas plasma deposition method. The coating method, according to one embodiment of the method, involves generating a gas plasma by introducing a mixture of a fluorinated gas monomer and a hydrocarbon gas into an energetic ion field, such as an ion beam or the field produced by a radio-frequency source. The fluorinated gas monomer is selected from the group consisting of CF.sub.4, C.sub.2 F.sub.4, C.sub.2 F.sub.6, CF.sub.3.sub.2CO, CH.sub.2 CF.sub.2 and mixtures of the foregoing. The hydrocarbon gas is selected from the group consisting of C.sub.2 H.sub.2, C.sub.2 H.sub.4, C.sub.2 H.sub.6, and H.sub.2 and mixtures of the foregoing. The polymer substrate is exposed to the foregoing gas plasma for sufficient time to achieve the desired coating thickness.

20 Claims, 5 Drawing Sheets

LUBRICIOUS, WEAR RESISTANT SURFACE COATING BY PLASMA POLYMERIZATION

TECHNICAL FIELD

The present invention generally relates to plasma polymerization film forming methods and, more particularly, plasma polymerization film forming methods suitable for, for example, the formation of a plasma polymerization coating for silicone rubber and other polymeric substrates used as a covering for electrical leads of implantable medical devices.

BACKGROUND

Synthetic polymers, especially silicone rubbers, are used for many medical applications because they are substantially inert materials exhibiting good biocompatibility. Silicone rubbers and other polymeric materials suffer from high surface friction and surface tackiness, and have rather poor abrasion and wear resistance. These characteristics are problematic for many medical applications.

High surface friction and surface tackiness, and poor abrasion and wear resistance are characteristics which are problematic for many medical applications. For example, pacemaker leads having a silicone rubber insulating coating or covering do not easily slide past one another within the venous system dramatically limiting their use in dual pacing applications. Hemostasis valves generally require the addition of silicone oils to enable catheters to slide through the valve opening.

Many other medical devices such as penile implants suffer from poor lubricity when silicone tubes are inflated within silicone restraints. Poor contact surface lubricity causes sticking and/or hampered or unpredictable sliding performance which may occur at inopportune times, such as during insertion of catheters. Poor slip characteristics between the catheter and the slide site may result in abrasion or erosion of the silicone coating/covering leading to undesirable exposure of the lead conductor.

Prior attempts of providing desirable characteristics to silicones and other polymers resulted in undesirable characteristics. Some methods weaken the polymeric material leading to premature failure. Others introduce undesirable compounds into the blood stream. There remains a need for an improved surface modification or coating which provides the benefit of lubricity while maintaining abrasion and wear resistance.

SUMMARY

The present methods provide a substantially amorphous, conformal, protective, abrasion-resistant, lubricious fluoropolymer coating via a gas plasma deposition method. The coating method, according to one embodiment, involves generating a gas plasma by introducing a mixture of a fluorinated gas monomer and a hydrocarbon gas into an energetic ion field, such as an ion beam or the field produced by a radio-frequency source. The fluorinated gas monomer is selected from the group consisting of CF.sub.4, C.sub.2 F.sub.4, C.sub.2 F.sub.6, CF.sub.3.sub.2CO, CH.sub.2 CF.sub.2 and mixtures of the foregoing. The hydrocarbon gas is selected from the group consisting of C.sub.2 H.sub.2, C.sub.2 H.sub.4, C.sub.2 H.sub.6, and H.sub.2 and mixtures of the foregoing.

The present methods are particularly well-suited to the manufacture of electrical leads with lubricious, abrasion-resistant biocompatible properties. Other applications of the method are within the scope of this disclosure.

DETAILED DESCRIPTION

Figure 1:
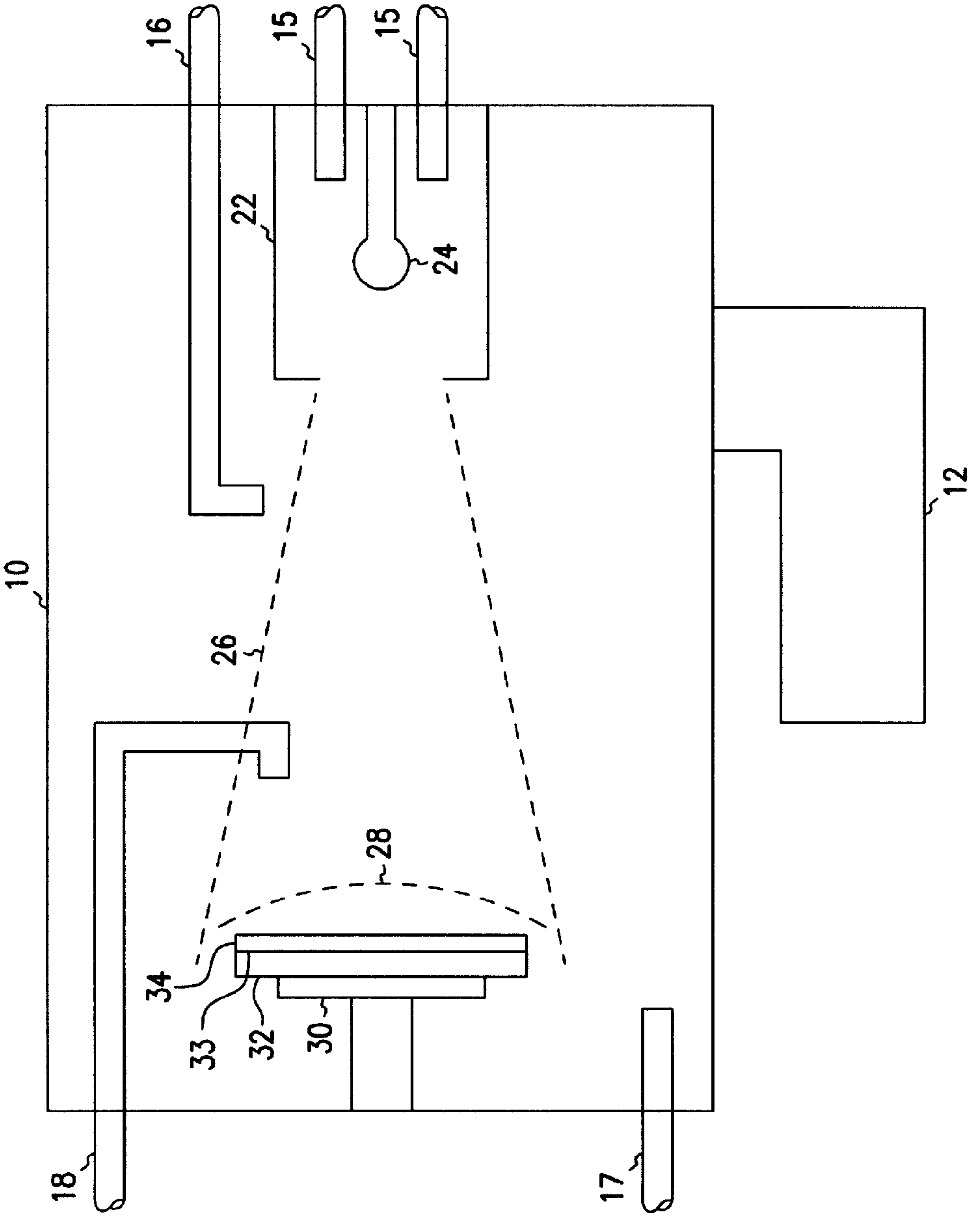
FIG. 1 is a schematic of an apparatus for carrying out gas plasma deposition, in accordance with one embodiment.

In the following detailed description, reference is made to the accompanying drawings, which are not necessarily to scale, which form a part hereof, and in which is shown by way of illustrating specific embodiments in which the methods may be practiced. These embodiments are described in sufficient detail to enable those skilled in the art to practice the methods, and it is to be understood that the embodiments may be combined, or that other embodiments may be utilized without departing from the spirit and scope. The following detailed description is, therefore, not to be taken in a limiting sense, and the scope is defined by the appended claims and their equivalents. In the drawings, like numerals describe substantially similar components throughout the several views.

The present methods will be described in applications involving cardiac pacing electrical leads. However, it is understood that the present methods may be employed in other applications. The present methods are directed to a plasma polymerization film forming method for forming a plasma polymerization coating on a polymer surface, such as found on silicone rubber- or polyurethane-coated pacing leads. The associated methods provide polymerization techniques which are especially useful for applying a fluoropolymer coating to the surface of silicone rubber, polyurethane and other polymers. According to one embodiment of the method, a plasma is formed by introducing a fluorinated gas monomer admixed with a hydrocarbon gas into an ion beam, depositing a fluoropolymer coating on the substrate via plasma deposition. This provides an abrasion-resistant lubricious fluoropolymer coating to the substrate.

FIG. 1 is a schematic of an apparatus for carrying out gas plasma deposition, in accordance with one embodiment of the method. It is understood that any appropriate gas plasma deposition apparatus may be used to practice the method. The coating process is carried out inside a vacuum chamber 10. The vacuum chamber 10 is evacuated by pumping with a vacuum pump 12. Vacuum pump 12 can be a diffusion pump, turbomolecular pump, cryogenic pump ("cryopump"), high vacuum pump, among others.

A substrate 32 to be coated is mounted on a substrate holder 30. In one embodiment, the substrate holder 30 incorporates tilt, rotation, planetary motion, or combination thereof. In one embodiment, prior to deposition of a coating 34, the substrate 32 is optionally ion beam sputter-etched with an energetic ion beam 26 generated by an ion beam source 24. The ion beam source 24 is any ion source, including Kaufman-type direct current discharge ion sources, radio frequency or microwave frequency plasma discharge ion sources, and microwave electron cyclotron resonance ion sources, among others.

According to one embodiment of the method, the substrate 32 is chemically cleaned to remove contaminants. Details of the cleaning procedure depend upon the nature of the contamination and residue remaining on the substrate 32 after manufacture and subsequent handling.

After cleaning, the substrate 32 is inserted into the vacuum chamber 10. The vacuum chamber 10 is evacuated to a pressure of about 0.01 mTorr or less. The exact level of vacuum is dependent upon the nature of the substrate 32 material, the sputter-etching rate, the constituents present in the vacuum chamber residual gas, and the details of the coating process. A too low of a pressure slows down the process and reduces the throughput of the coating system. A too high of a pressure may allow an undesirable level of contamination within the chamber or lead to inefficient plasma generation.

In one embodiment, the substrate surface 33 is pre-treated, hereinafter referred to as sputter-etching, with an active or inert gas plasma in an ion beam 26 to assist in the removal of residual contaminants. Residual contaminants include residual hydrocarbons and surface oxides, among others. Sputter-etching also "activates" the substrate surface 33 for better adhesion of the coating 34.

Sputter-etching is effectively carried out with inert gases such as argon, krypton, and xenon, among others. In one embodiment, during sputter-etching, chemical etchants such as oxygen or nitrogen, among others, are introduced into the vacuum chamber 10 and, used independently or mixed with other gases, to provide chemically-assisted sputter-etching. The sputter-etching source gas is introduced in a variety of different ways, including direct introduction into a plasma chamber 22 of the ion source 24 through one or more inlets 15, introduction near the ion source 24 but not directly into the ion source 24 through inlet 16, or introduction into a location remote from the ion source 24, as the vacuum chamber background gas, through inlet 17, among others. In one embodiment, an ion beam 26 energy greater than about 20 eV is used. In another embodiment, an ion beam 26 energy up to about 2000 eV is used.

By the term "ion beam", it is intended to mean a beam of ions generated from a plasma which is remote from the substrate. The ions are extracted from the plasma by a variety of techniques which include, but are not limited to, the use electrostatic grids which are biased to promote extraction of positive ions, e.g. Kaufman-type ion source; magnetic fields coupled with electrostatic fields, e.g. End Hall-type ion source; Hall accelerators; among others. After extraction, the ions are directed from the ion source 24 toward the substrate 32 buy a potential difference between the ion source 24 and the substrate 32, which, in one embodiment, is at or near ground potential.

In one embodiment, the ion beam 26 is charge neutralized with electrons by a neutralizer source. Neutralizing electrons are obtained from a variety of sources including, but not limited to, a thermionic hot filament, a plasma bridge neutralizer, a hollow cathode, among others. Charging neutralization of the ion beam 26 allows the processing of electrically insulating substrates 32 in a very stable fashion since the potential of the substrate 32 is maintained.

During deposition, a deposition zone 28 is established where the substrate 32 is placed to receive the coating 34. In one embodiment, pressures in the deposition zone 28 around the substrate 32 are held in the range of about 0.001 mTorr to about 0.5 mTorr so that ion-gas collisions are minimized. This maintains the high energy ion bombardment of the substrate surface 33 which is necessary for the formation of a quality coating 34. This sputter-etching of the substrate surface 33 is helpful to achieve high adhesion between the substrate surface 33 and the coating 34 layer(s).

Immediately after the substrate surface 33 has been sputter-etched, in one embodiment, or after placing the substrate 32 in to the vacuum chamber 10 if sputter-etching is not used, in another embodiment, a fluoropolymer coating 34 is applied to the substrate 32 by ionizing a fluorinated gas monomer admixed with a hydrocarbon gas. The fluorinated gas monomer is selected from the group consisting of CF.sub.4, C.sub.2 F.sub.4, C.sub.2 F.sub.6, CF.sub.3.sub.2CO, CH.sub.2 CF.sub.2 and mixtures of the foregoing. The hydrocarbon gas is selected from the group consisting of C.sub.2 H.sub.2, C.sub.2 H.sub.4, C.sub.2 H.sub.6, and H.sub.2 and mixtures of the foregoing. In one embodiment, the ion beam 24 is generated by introducing the gas mixture outside of the ion source 24 and into the plasma ion beam 26. This causes the ion beam 26 containing the gas mixture to undergo "activation". Examples of "activation" include, but are not limited to, simple electronic excitation; ionization; chemical reaction with other species, ions and neutrals, which may be electrically excited; and decomposition into simpler ionic or neutral species which may be electronically excited. Some of the activated species then condense on the substrate surface 33 creating the desired coating 34.

The operating pressure of the vacuum chamber 10 is held within the range of about 0.2 Torr to about 0.4 Torr during the coating process. The input power for the ion source 24 is held within the range of about 500 Watts to about 1500 Watts. In one embodiment, the input power for the ion source 24 is pulsed. In one embodiment the ion beam-deposited coating 34 is produced as one or more layers. In one embodiment, deposition time is about 5 minutes to about 30 minutes, but other times are within the scope of the invention. Deposition times depend on the desired thickness of the fluoropolymer coating 34. Once the desired thickness of the coating 34 has been achieved, the deposition process on the substrate 32 is terminated, the vacuum chamber 10 pressure is increased to atmospheric pressure, and the coated substrate 32 having an improved lubricious abrasion-resistant coating 34 is removed from the vacuum chamber 10.

Figure 2:
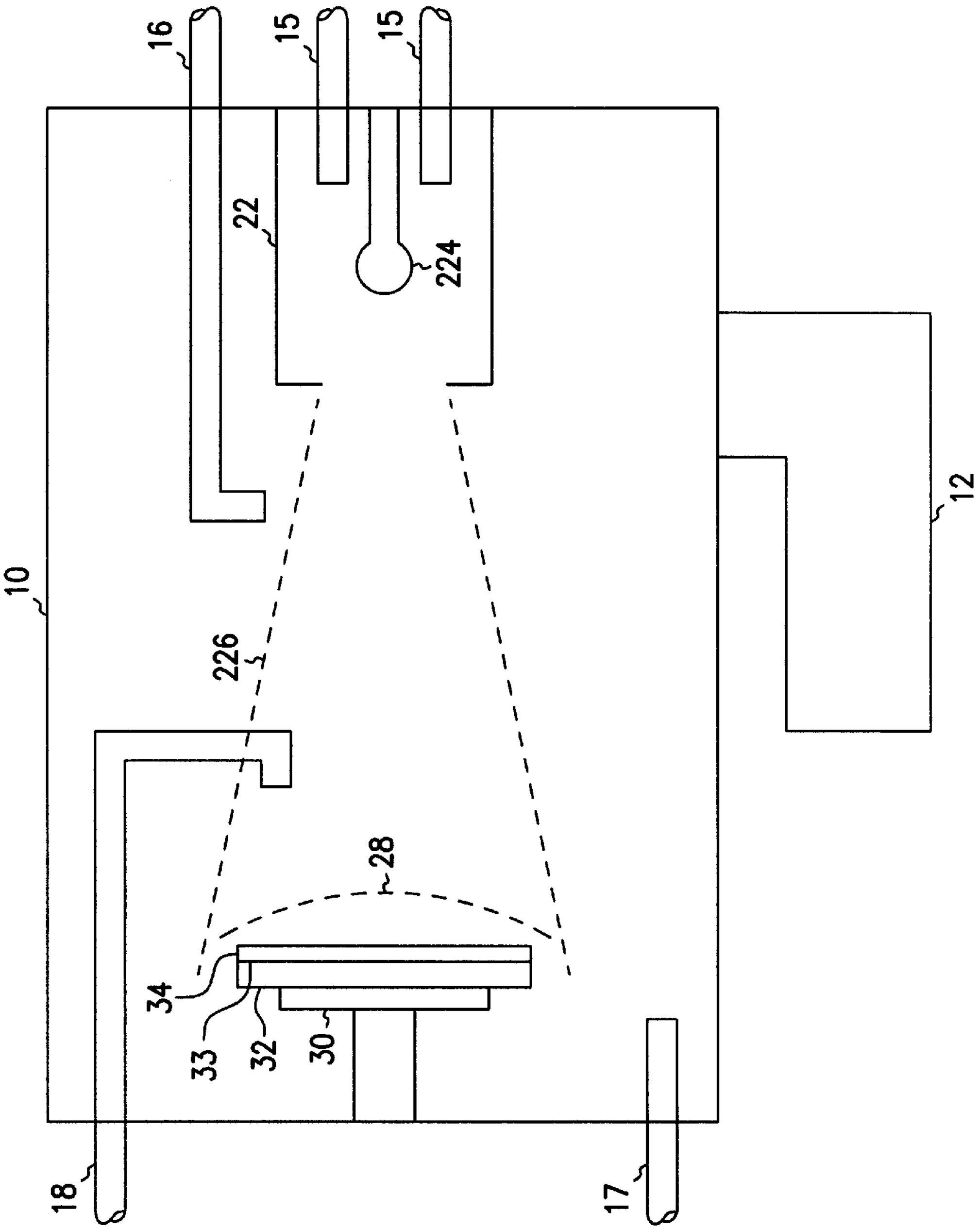
FIG. 2 is a schematic of an apparatus for carrying out gas plasma deposition, in accordance with one embodiment of the method.

FIG. 2 is a schematic of an apparatus for carrying out gas plasma deposition, in accordance with one embodiment of the method, where a radio frequency (RF) source is used as an ion source 224. The substrate 32 is chemically cleaned to remove unwanted materials and other contaminants. The substrate 32 is inserted into a vacuum chamber 10 and the air in the vacuum chamber 10 is evacuated. In one embodiment, the substrate surface 33 is pre-treated, or sputter-etched, with an active or inert gas plasma energized by the RF source 224. Sputter-etching assists the removal of residual contaminants such as residual hydrocarbons and surface oxides, among others. Sputter-etching also "activates" the surface 33, enhancing coating 34 adhesion.

A lubricious, abrasion-resistant coating 34 is deposited using selected precursor gases by RF deposition. A plasma is generated in the plasma chamber 22 and a gas stream containing a mixture of a fluorinated gas monomer and hydrocarbon gas is introduced outside of the RF source 224 and into the plasma RF beam 226. The fluorinated gas monomer is selected from the group consisting of CF.sub.4, C.sub.2 F.sub.4, C.sub.2 F.sub.6, CF.sub.3.sub.2CO, CH.sub.2 CF.sub.2 and mixtures of the foregoing. The hydrocarbon gas is selected from the group consisting of C.sub.2 H.sub.2, C.sub.2 H.sub.4, C.sub.2 H.sub.6, and H.sub.2 and mixtures of the foregoing.

The operating pressure is maintained within the range of about 0.2 Torr to about 0.4 Torr during the coating process. The input power for the RF source 224 is maintained within the range of about 500 Watts to about 1500 Watts. In one embodiment, the input power is pulsed. In one embodiment, the RF source 224 may operate at a frequency of about 13.56 MHZ. Further, in another embodiment, a frequency of about 40 kHz is used. Other frequencies are within the scope of the invention.

In one embodiment, the deposition time is within the range of about 5 minutes to about 30 minutes, but any deposition time is within the scope of the invention. The deposition time is dependent on the desired thickness of the fluorpolymer coating 34. In one embodiment, the RF-deposited coating 34 contains one or more layers. Once the desired thickness of the coating 34 has been achieved, the deposition process on the substrate 32 is terminated, the vacuum chamber 10 pressure is increased to atmospheric pressure, and the coated substrate 32 having improved lubricious abrasion-resistance is removed from the vacuum chamber 10.

In one embodiment, the method is carried out in a batch-type vacuum deposition apparatus, in which the vacuum chamber 10 is evacuated and vented to atmosphere after processing each batch of substrates 32. In another embodiment, the method is carried out in an in-line vacuum deposition apparatus, in which substrates 32 are moved constantly from atmosphere, through differential pumping zones, into the vacuum chamber 10, back through differential pumping zones, and returned to atmospheric pressure. Further, in another embodiment, the substrate 32 may be on a spool apparatus which passes the substrate 32 continuously through the deposition zone 28, which allows the coating of long substrates 32. Other methods are within the scope of the invention.

Figure 3:
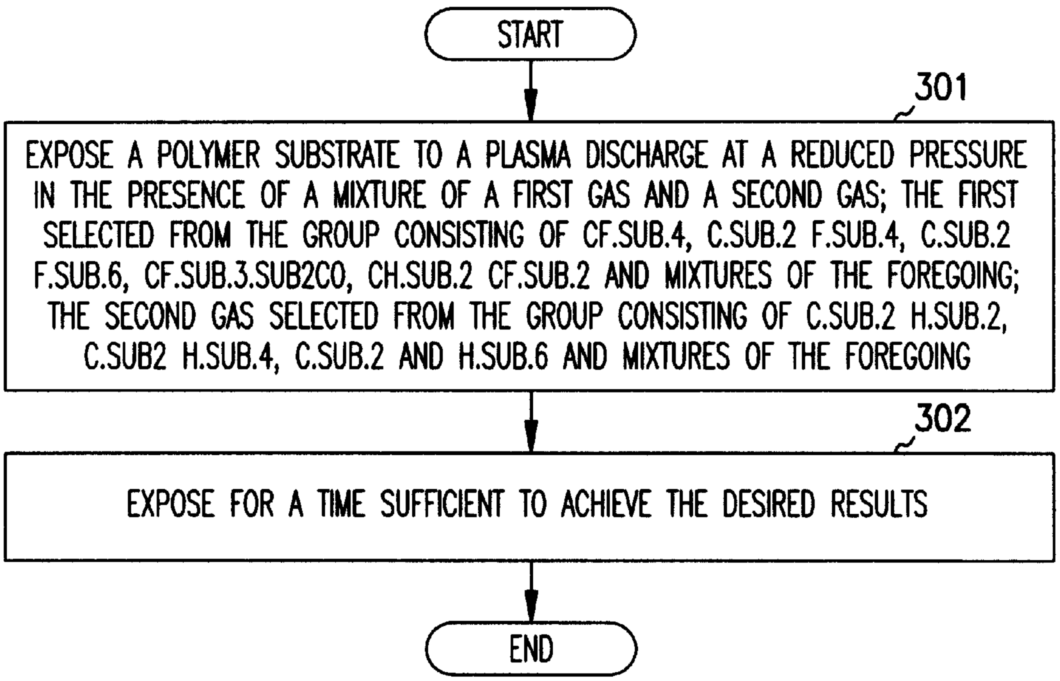
FIG. 3 is a block diagram of a method for coating a polymer substrate with a fluoropolymer coating via gas plasma deposition, in accordance with one embodiment.

FIG. 3 is a block diagram of a method for coating a polymer with a fluoropolymer coating via gas plasma deposition, in accordance with one embodiment of the method. The method represented by 301–302, comprises exposing the polymer substrate to a plasma discharge at a reduced pressure in the presence of a mixture of a first gas and a second gas; the first gas selected from the group consisting of CF.sub.4, C.sub.2 F.sub.4, C.sub.2 F.sub.6, CF.sub.3.sub.2CO, CH.sub.2 CF.sub.2 and mixtures of the foregoing; the second gas selected from the group consisting of C.sub.2 H.sub.2, C.sub.2 H.sub.4, C.sub.2 H.sub.6, and H.sub.2 and mixtures of the foregoing 301; and an exposure time sufficient to achieve the desired results 302.

Figure 4:
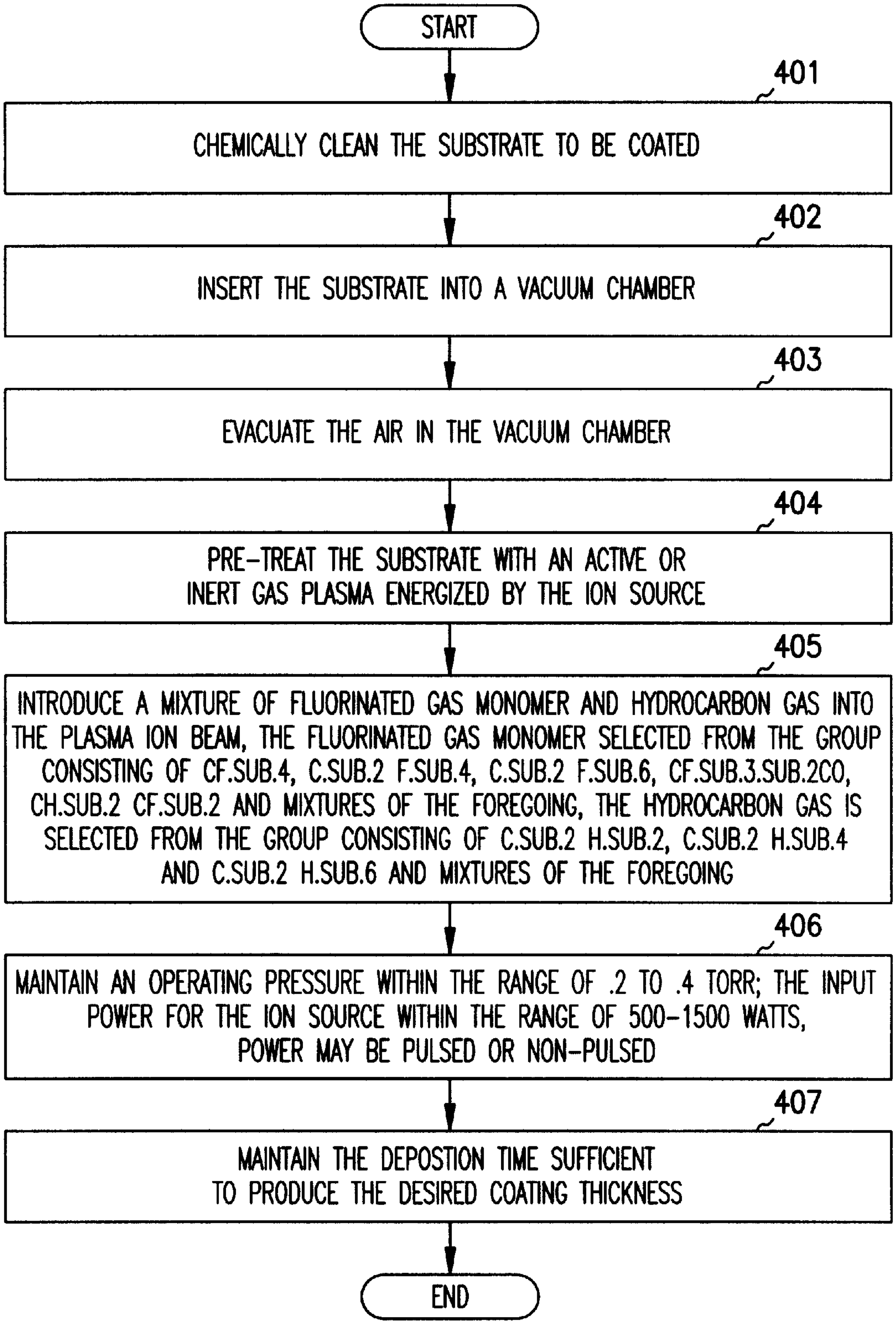
FIG. 4 is a block diagram of a method for coating a polymer substrate with a fluoropolymer coating via gas plasma deposition, in accordance with one embodiment.

FIG. 4 is a block diagram of a method for coating a polymer with a fluoropolymer coating via gas plasma deposition, in accordance with two embodiments of the method. The first embodiment of the method, represented by 401–407, comprises chemically cleaning the substrate to be coated 401; inserting the substrate into a vacuum chamber 402; evacuating the air in the vacuum chamber 403; pre-treating the substrate with an active or inert gas plasma energized by an ion source 404; introducing a mixture of a fluorinated gas monomer and hydrocarbon gas into the plasma ion beam, the fluorinated gas monomer selected from the group consisting of CF.sub.4, C.sub.2 F.sub.4, C.sub.2 F.sub.6, CF.sub.3.sub.2CO, CH.sub.2 CF.sub.2 and mixtures of the foregoing, and the hydrocarbon gas selected from the group consisting of C.sub.2 H.sub.2, C.sub.2 H.sub.4, C.sub.2 H.sub.6, and H.sub.2 and mixtures of the foregoing 405; maintaining an operating pressure within the range of about 0.2 Torr to about 0.4 Torr, the input power for the ion source within the range of about 500 Watts to about 1500 Watts, the power may be pulsed or non-pulsed 406; and maintaining the deposition time sufficient to produce the desired coating thickness 407.

The second embodiment of the method, represented by 401–403 and 405–407, each of which is substantially as described above, does not have a pre-treatment step.

Figure 5:
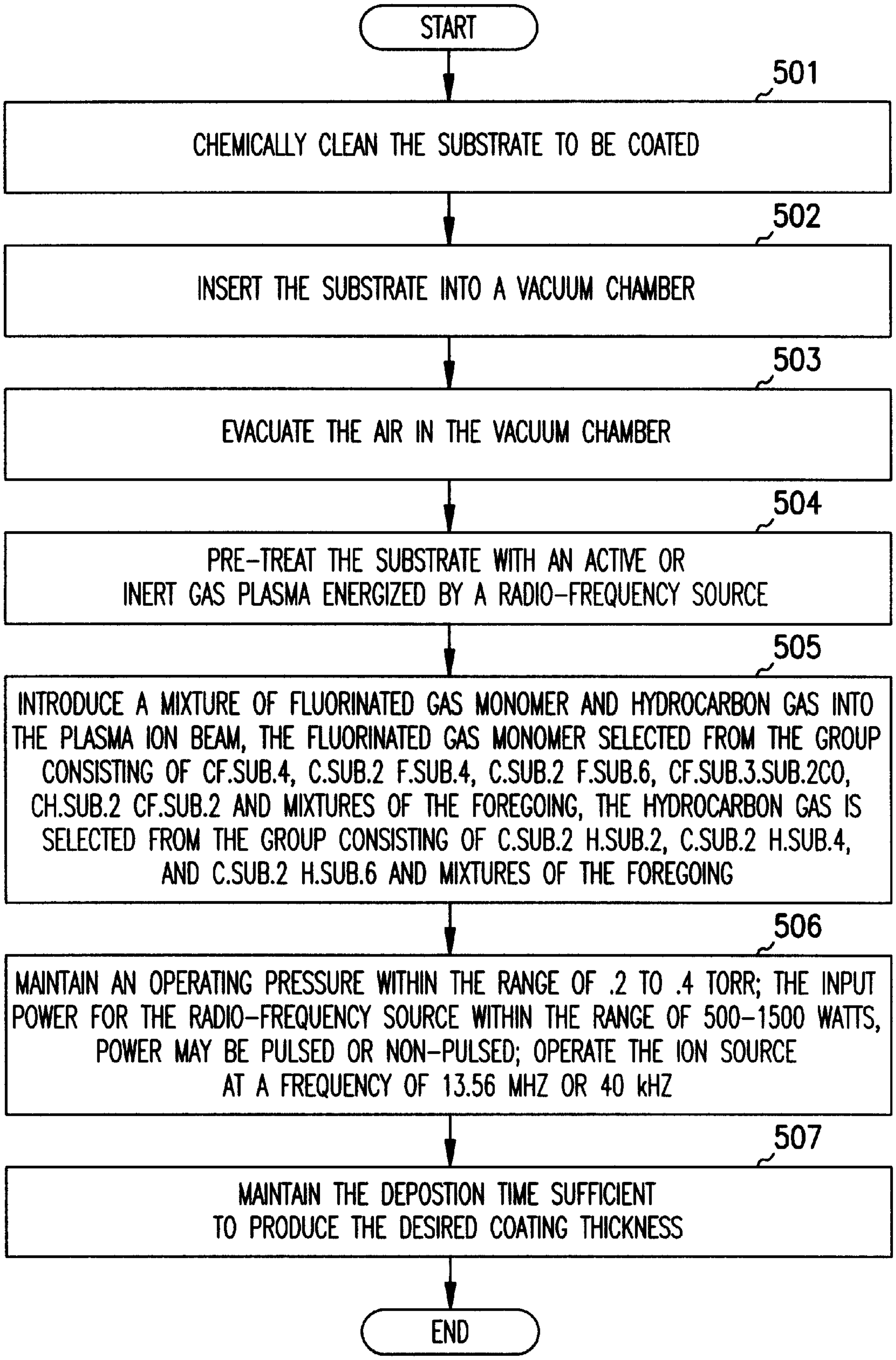
FIG. 5 is a block diagram of a method for coating a polymer substrate with a fluoropolymer coating via gas plasma deposition, in accordance with one embodiment.

FIG. 5 is a block diagram of a method for coating a polymer with a fluoropolymer coating via gas plasma deposition, in accordance with two embodiments of the method. The first embodiment of the method, represented by 501–507, comprises chemically cleaning the substrate to be coated 501; inserting the substrate into a vacuum chamber 502; evacuating the air in the vacuum chamber 503; pre-treating the substrate with an active or inert gas plasma energized by a radio-frequency ion source 504; introducing a mixture of a fluorinated gas monomer and hydrocarbon gas into the plasma radio-frequency ion beam, the fluorinated gas monomer selected from the group consisting of CF.sub.4, C.sub.2 F.sub.4, C.sub.2 F.sub.6, CF.sub.3.sub.2CO, CH.sub.2 CF.sub.2 and mixtures of the foregoing, and the hydrocarbon gas selected from the group consisting of C.sub.2 H.sub.2, C.sub.2 H.sub.4, C.sub.2 H.sub.6, and H.sub.2 and mixtures of the foregoing 505; maintaining an operating pressure within the range of about 0.2 Torr to about 0.4 Torr, the input power for the radio-frequency ion source within the range of about 500 Watts to about 1500 Watts, the power may be pulsed or non-pulsed, operating the radio-frequency ion source at a frequency of about 13.56 MHZ or about 40 kHz 506; and maintaining the deposition time sufficient to produce the desired coating thickness 507.

The second embodiment of the method, represented by 501–503 and 505–507, each of which is substantially as described above, does not have a pre-treatment step.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of coating a polymer substrate with a fluoropolymer to a desired thickness, comprising:

exposing the polymer substrate to a plasma discharge at a reduced pressure in the presence of a mixture of a first gas and a second gas, the first gas selected from the group consisting of CF.sub.4, C.sub.2 F.sub.4, C.sub.2 F.sub.6, CF.sub.3.sub.2CO, CH.sub.2 CF.sub.2 and mixtures of the foregoing, the second gas selected from the group consisting of C.sub.2 H.sub.2, C.sub.2 H.sub.4, and C.sub.2 H.sub.6, and mixtures of the foregoing; and providing an exposure time sufficient to achieve the desired coating thickness.

2. The method of claim 1 wherein exposing the polymer substrate to a plasma discharge comprises generating a plasma discharge using a radio frequency source at a frequency of about 13.56 MHZ.

3. The method of claim 2 wherein exposing the polymer substrate to a plasma discharge comprises exposing the polymer substrate to a plasma discharge having a plasma discharge power in the range of about 500 Watts to about 1500 watts.

4. The method of claim 1 wherein exposing the polymer substrate to a plasma discharge comprises generating a plasma discharge using a radio frequency source at a frequency of about 40 kHz.

5. The method of claim 3 wherein exposing the polymer substrate to a plasma discharge comprises exposing the polymer substrate to a plasma discharge having a plasma discharge power in the range of about 500 Watts to about 1500 watts.

6. The method of claim 1 wherein exposing the polymer substrate to a plasma discharge at a reduced pressure comprises exposing the polymer substrate to a plasma discharge at a pressure of about 200 mTorr to about 400 mTorr.

7. The method of claim 1 wherein providing an exposure time sufficient to achieve the desired coating thickness comprises providing an exposure time greater than or equal to 5 minutes.

8. The method of claim 1 wherein exposing the polymer substrate to a plasma discharge comprises exposing the polymer substrate to a plasma discharge generated by a constant radio frequency source at a frequency of about 13.56 MHZ.

9. The method of claim 1 wherein exposing the polymer substrate to a plasma discharge comprises exposing the polymer substrate to a plasma discharge generated by a constant radio frequency source at a frequency of about 40 kHz.

10. The method of claim 1 wherein exposing the polymer substrate to a plasma discharge comprises exposing the polymer substrate to a plasma discharge generated by a pulsed radio frequency source at a frequency of about 13.56 MHZ.

11. The method of claim 1 wherein exposing the polymer substrate to a plasma discharge comprises exposing the polymer substrate to a plasma discharge generated by a pulsed radio frequency source at a frequency of about 40 kHz.

12. The method of claim 1 wherein exposing the polymer substrate to a plasma discharge comprises exposing the polymer substrate to a plasma discharge generated by an ion source.

13. The method of claim 1 further comprising pre-treating the polymer with an active gas plasma prior to exposing the polymer substrate to the plasma discharge.

14. The method of claim 13 wherein pre-treating the polymer with an active gas plasma prior to exposing the polymer substrate to the plasma discharge comprises pre-treating the polymer with an active gas plasma, the gas selected from the group consisting of oxygen and nitrogen, prior to exposing the polymer substrate to the plasma discharge.

15. The method of claim 1 further comprising pre-treating the polymer with an inert gas plasma prior to exposing the polymer substrate to the plasma discharge.

16. The method of claim 15 wherein pre-treating the polymer with an inert gas plasma prior to exposing the polymer substrate to the plasma discharge comprises pre-treating the polymer with an inert gas plasma, the gas selected from the group consisting of argon, krypton and xenon, prior to exposing the polymer substrate to the plasma discharge.

17. The method of claim 1 wherein exposing the polymer substrate comprises exposing a silicone rubber substrate.

18. The method of claim 1 wherein exposing the polymer substrate comprises exposing a polyurethane substrate.

19. A method of coating a polymer substrate with a fluoropolymer, comprising:

chemically cleaning the polymer substrate;

inserting the substrate into a vacuum chamber;

evacuating the air in the vacuum chamber;

pre-treating the substrate with an active or inert gas plasma energized by an ion source;

exposing the substrate to a plasma discharge at a reduced pressure in the presence of a mixture of a first gas and a second gas; the first gas selected from a group consisting of CF.sub.4, C.sub.2 F.sub.4, C.sub.2 F.sub.6, CF.sub.3.sub.2CO, CH.sub.2 CF.sub.2 and mixtures of the foregoing; the second gas selected from a group consisting of C.sub.2 H.sub.2, C.sub.2 H.sub.4, and C.sub.2 H.sub.6, and mixtures of the foregoing;

maintaining an operating pressure within the range of about 0.2 Torr to about 0.4 Torr;

maintaining the input power for the ion source within the range of about 500 Watts to about 1500 Watts; and providing an exposure time sufficient to achieve a desired coating thickness.

20. A method of coating a polymer substrate with a fluoropolymer, comprising:

chemically cleaning the polymer substrate;

inserting the substrate into a vacuum chamber;

evacuating the air in the vacuum chamber;

exposing the substrate to a plasma discharge at a reduced pressure in the presence of a mixture of a first gas and a second gas; the first gas selected from a group consisting of CF.sub.4, C.sub.2 F.sub.4, C.sub.2 F.sub.6, CF.sub.3.sub.2CO, CH.sub.2 CF.sub.2 and mixtures of the foregoing; the second gas selected from a group consisting of C.sub.2 H.sub.2, C.sub.2 H.sub.4, and C.sub.2 H.sub.6, and mixtures of the foregoing;

maintaining an operating pressure within the range of about 0.2 Torr to about 0.4 Torr;

maintaining the input power for the ion source within the range of about 500 Watts to about 1500 Watts; and providing an exposure time sufficient to achieve a desired coating thickness.

* * * * *

UNITED STATES PATENT AND TRADEMARK OFFICE

CERTIFICATE OF CORRECTION

PATENT NO. : 6,506,457 B2
DATED : January 14, 2003
INVENTOR(S) : Hum

It is certified that error appears in the above-identified patent and that said Letters Patent is hereby corrected as shown below:

Column 7,
Line 10, delete "claim 3" and insert -- claim 4 --, therefor.

Signed and Sealed this

Nineteenth Day of August, 2003

JAMES E. ROGAN
*Director of the United States Patent and Trademark Office*